Patented Dec. 14, 1943

2,336,636

UNITED STATES PATENT OFFICE 2,336,636

MOLDED INSULATING ARTICLE

Norman R. Peterson, Midland, Mich., assignor to The Dow Chemical Company, Midland, Mich., a corporation of Michigan No Drawing. Application March 30, 1942, Serial No. 436,770

6 Claims. (Cl. 106—122)

This invention relates to a method and products useful in the preparation of insulating shapes from porous insulating materials.

Exfoliated vermiculite, cork, wood fiber, etc., have been used extensively as insulating materials both in granular form and in the form of molded shapes. In preparing molded shapes therefrom, it has been the custom to use as a binder such materials as plaster of Paris, cement, and soluble silicates. Such binders become brittle upon drying and usually leave the article friable and easily broken. The articles wherein these materials are used as binders are also heavy and cumbersome to handle. Casein adhesives have been used as binders but, as is well known, casein is subject to fungous attack and is not entirely impervious to water. The use of fungicidal preservatives and/or of water resistant casein adhesives has not entirely overcome these difficulties. Other binders such as Bakelite resin have also been suggested, but their use requires either baking of the formed article in the mold or allowing it to dry for an excessively long period. The use of resins of this type is thus not conducive to rapid and economical manufacture of insulating shapes.

It is an object of the present invention to provide a binder for porous insulating materials which is water- and fire-resistant and effective when used in minor amounts.

An additional object is to provide a shaped article consisting essentially of a porous insulating material, together with a minor proportion of a binder, which is relatively flexible, non-friable, light in weight, and resistant to water and fire.

An additional object is to provide an improved method of manufacturing insulating shapes from a porous insulating material and a flexible, water-resistant binder whereby prolonged baking of the article in the mold or extended drying periods are avoided.

The foregoing and related objects are readily accomplished by treating a porous insulating material with an aqueous solution of a polyvalent metal salt of a carboxy alkyl cellulose and a volatile alkali, forming the wet porous insulating material in the desired shape in a mold and drying the formed shape.

Although any porous insulating material, such as cork, wood fiber, etc., may be used, the invention will be described with reference to exfoliated vermiculite.

Although any polyvalent metal salt of a carboxy alkyl cellulose, e. g. the aluminum, copper, zinc, iron, tin, nickel, and chromium salts of carboxy methyl cellulose, carboxy ethyl cellulose, carboxy propyl cellulose, etc., which is insoluble in water but soluble in aqueous solutions of volatile alkalies may be used, the invention will be described with reference to the aluminum salt or carboxy methyl cellulose, i. e. aluminum cellulose glycolate, derived from a cellulose glycolic acid, having on the average from 0.3 to 1.5, preferably from 0.4 to 0.7 carbomethoxy groups for each anhydro-glucose unit.

Although ammonia is the preferred volatile alkali because of its ready availability, and although the invention will be described with reference to ammonia, other volatile alkalies such as the alkyl amines, e. g. methyl amine, dimethyl amine, ethyl amine, propyl amine, trimethyl amine, methyl ethyl amine, ethylene diamine, etc., may be used, if desired.

The solution of aluminum cellulose glycolate may be prepared in any one of a number of ways, such as by adding an aluminum salt of a mineral acid to an ammoniacal solution of sodium cellulose glycolate or to an aqueous solution of cellulose glycolic acid dissolved in an excess of ammonia. The solution is, however, preferably prepared by dissolving aluminum cellulose glycolate in water containing sufficient ammonia to maintain the glycolate in solution, since in this way the presence of inorganic salts in the solution is avoided. At least 0.2 mol of ammonia is used for each $C_6$ unit of the aluminum cellulose glycolate, and larger proportions may be used if desired. The solution may be prepared at ordinary room temperatures or, if desired, at elevated temperatures provided excessive loss of ammonia from the solution is avoided. The solution is usually prepared to contain from 0.1 to 3.0 per cent by weight of aluminum cellulose glycolate, depending on the viscosity of the particular grade of glycolate used. Sufficient aluminum cellulose glycolate should be used to thicken substantially the aqueous solution thereof. Such thickened solutions penetrate very little into the pores of the insulating material, thus leaving the major portion of the aluminum cellulose glycolate on the outside of the particles where it effectively serves to coat and bond the particles together.

The vermiculite, usually in granular or powder form, and the solution of aluminum cellulose glycolate are mixed together thoroughly, and the agglomerate so formed is pressed into the desired shape in a mold. Sufficient solution is used to yield a wet agglomerate containing from 1.5 to 5 per cent by weight of the aluminum cellulose glycolate based on the weight of the vermiculite. The composition and proportion of the solution used are usually adjusted so that the vermiculite is thoroughly wetted by the solution, and the wet agglomerate is of such a consistency that it may be molded by pressure into shapes which have sufficient structural strength to allow their being removed from the mold without substantial deformation. The molding may be carried out at ordinary room temperature or at elevated temperatures, as preferred.

The molded shape is then dried whereby the water and ammonia are volatilized leaving the particles of vermiculite firmly bonded together by the tough, flexible, insoluble aluminum cellulose glycolate. Drying may be carried out under vacuum or at atmospheric pressure or at pressures somewhat above atmospheric and at temperatures effecting rapid volatilization of the water and the ammonia. The drying time depends, among other factors, on the temperature and pressure and, also, on the size and shape of the molded article. Due to the excellent heat insulating qualities of the molded composition, volatilization of the water and ammonia from the center of thick sections thereof occurs slowly. Drying should be carried on sufficiently long to insure deposition of the aluminum cellulose glycolate as a flexible binding film around the particles of vermiculite.

It should be pointed out that in the manufacture of molded shapes of uniform cross section, such as blocks, slabs, rods, tubes, etc., the wet agglomerate may be continuously extruded in an extrustion machine and the extruded shape issuing from the machine may be periodically severed into sections which may be subsequently dried in continuous manner, thus rendering the entire process continuous.

One mode of practicing the invention may be illustrated by the following specific example:

*Example*

250 grams of an aqueous solution containing 1.5 grams of aluminum cellulose glycolate and 0.3 gram of ammonia was mixed thoroughly with 100 grams of exfoliated vermiculite. A portion of the agglomerate was pressed in a mold into a brick-like shape and, after removal from the mold, was dried for 18 hours in a vacuum oven at a temperature of about 100° C. The baked article was found to be sufficiently flexible so that it was not easily shattered or broken. It was water- and fire-resistant.

I claim:

1. The method which includes: treating a porous insulating material with an aqueous solution of a polyvalent metal salt of a carboxy alkyl cellulose and a volatile alkali; shaping the treated insulating material in a mold; and drying the formed shape.

2. The method which includes: treating a porous insulating material with an aqueous solution of from 1.5 to 5 per cent of the weight of the insulating material of a polyvalent metal salt of a carboxy alkyl cellulose and a volatile alkali; shaping the treated insulating material in a mold; and drying the formed shape.

3. The method which includes: treating exfoliated vermiculite with an aqueous solution containing from 1.5 to 5 per cent of the weight of the vermiculite of a polyvalent metal salt of a carboxy alkyl cellulose and ammonia sufficient to maintain said metal salt in solution; shaping the treated vermiculite in a mold; and drying the formed shape.

4. The method which includes: treating exfoliated vermiculite with an aqueous solution containing from 1.5 to 5 per cent of the weight of the vermiculite of a polyvalent metal salt of cellulose glycolic acid and ammonia sufficient to maintain said metal salt in solution; shaping the treated vermiculite in a mold; and drying the formed shape.

5. The method which includes: treating exfoliated vermiculite with an aqueous solution containing from 1.5 to 5 per cent of the weight of the vermiculite of aluminum cellulose glycolate and ammonia sufficient to maintain said metal salt in solution; shaping the treated vermiculite in a mold; and drying the formed shape.

6. A molded insulating shape including a porous insulating material and, as a binder therefor, a water-insoluble polyvalent metal salt of a carboxy alkyl cellulose.

NORMAN R. PETERSON.